(12) United States Patent
Li

(10) Patent No.: US 6,332,681 B1
(45) Date of Patent: Dec. 25, 2001

(54) ADJUSTABLE TEMPLE FOR EYEGLASS FRAME

(75) Inventor: Chun-Huang Li, Tainan (TW)

(73) Assignee: Megasafe Products, Inc., Tainan (TW)

( * ) Notice: Subject to any disclaimer, the term of this patent is extended or adjusted under 35 U.S.C. 154(b) by 0 days.

(21) Appl. No.: 09/760,659

(22) Filed: Jan. 17, 2001

(51) Int. Cl.[7] .................................................. G02C 5/14

(52) U.S. Cl. .......................................... 351/120; 351/119

(58) Field of Search .................................. 351/120, 119, 351/118, 116, 111, 41

(56) References Cited

U.S. PATENT DOCUMENTS 5,381,192 * 1/1995 Canavan et al. ..................... 351/120

* cited by examiner

*Primary Examiner*—Hung Xuan Dang
(74) *Attorney, Agent, or Firm*—Rosenberg, Klein & Lee

(57) ABSTRACT

A regulating device for an eyeglasses temple has a movable member and a connecting member. The movable member is connected to a front end of a temple, and has a curved toothed portion on a front end. The connecting member is pivoted to a rim of the eyeglasses. The movable member is pivoted on the connecting member with the curved toothed portion movably engaging the connecting member for permitting the temple to be regulated in respect of an angle between same and the rim.

1 Claim, 2 Drawing Sheets

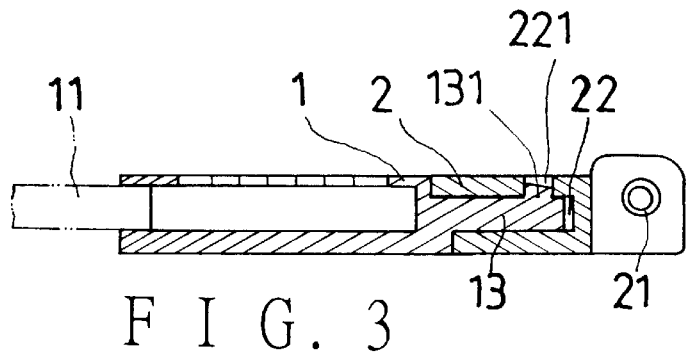
F I G. 3
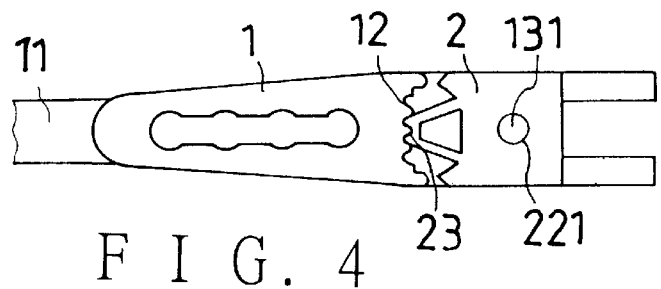
F I G. 4
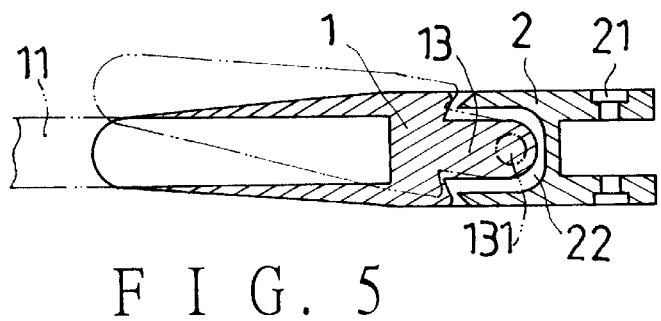
F I G. 5
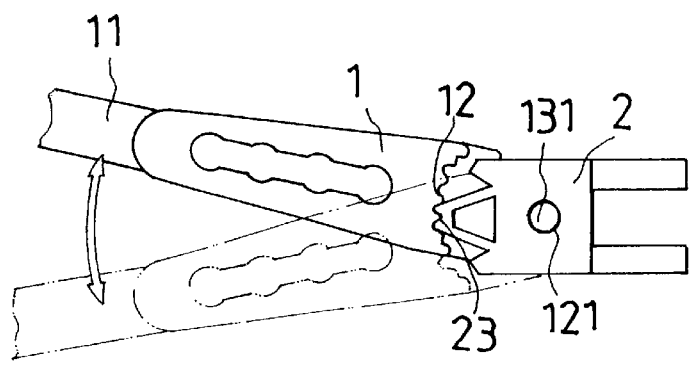
F I G. 6

ADJUSTABLE TEMPLE FOR EYEGLASS FRAME

BACKGROUND OF THE INVENTION

The present invention relates to a regulating device for an eyeglasses temple which can regulate the temple to a suitable position for the user to wear the eyeglasses comfortably.

The commonest eyeglasses are the kind which have a rim, and two temples pivoted to the rim; earpieces at rear ends of the temples are supported by ears of the user wearing the eyeglasses. Temples of various sizes and shapes are made for permitting different users to choose suitable ones which fit the size and shape of their faces.

Although eyeglasses have temples of various shapes and sizes in the market, most of them don't have a temple adjustable in respect of the position. Consequently, an user still can't have a pair of eyeglasses which are tailor-made for him/her and meet personal needs sufficiently

SUMMARY OF THE INVENTION

Therefore, it is a main object of the present invention to provide a regulating device for an eyeglasses temple such that the user can regulate the temples to a position most suitable for him/her, and wear the eyeglasses comfortably.

The regulating device of an eyeglasses temple of the present invention includes a movable member, and a connecting member.

The movable member is connected to a front end portion of the temple, and has a curved toothed portion on a front end. The connecting member is pivoted to a rim of the eyeglasses.

The movable member is pivoted to the connecting member from a front end portion with the curved toothed portion movably engaging an engaging part of the connecting member for permitting the temple to be regulated in respect of an angle between same and the rim. The curved toothed portion is shaped such that the movable member is stopped from moving relative to the connecting member normally, but able to move when force is applied on it.

BRIEF DESCRIPTION OF THE DRAWINGS

This invention will be better understood by referring to the accompanying drawings, wherein:

FIG. 3 is a cross-sectional view of the regulating device for an eyeglasses temple in FIG. 1.

FIG. 4 is a side view of the regulating device for an eyeglasses temple in FIG. 1.

FIG. 5 is a cross-sectional view of the regulating device for an eyeglasses temple of the present invention under regulating movement.

FIG. 6 is a side view of the regulating device for an eyeglasses temple of the present invention under regulating movement.

DETAILED DESCRIPTION OF THE PREFERRED EMBODIMENT

Figure 1:
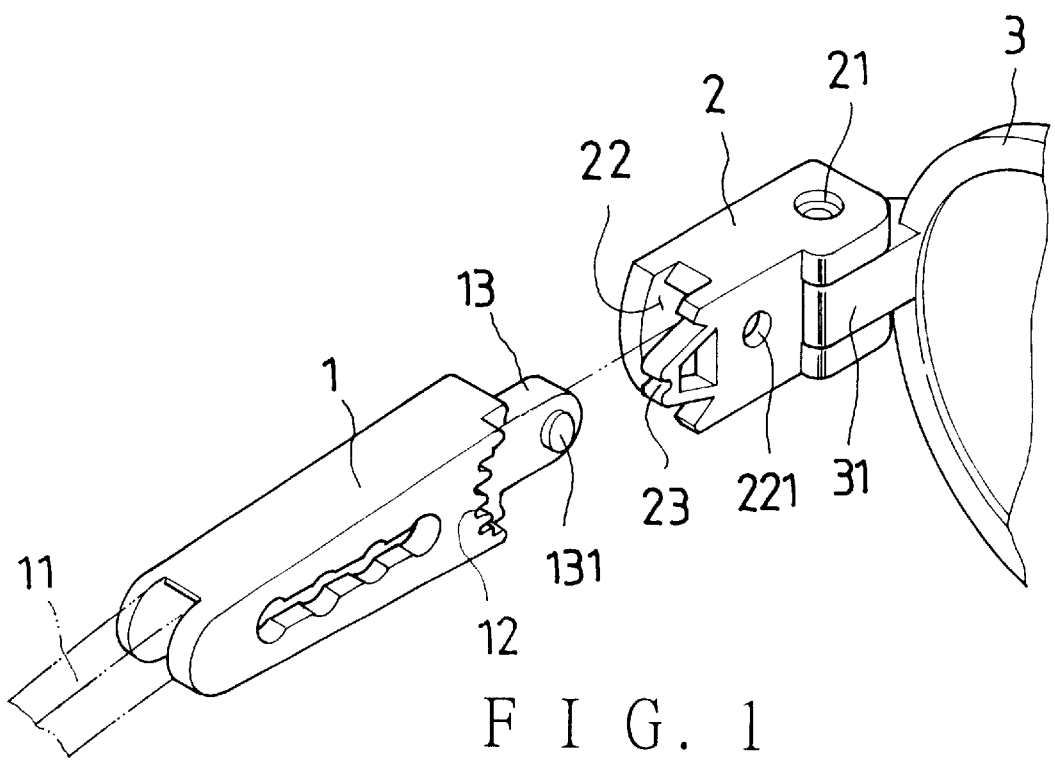
FIG. 1 is an exploded perspective view of a regulating device for an eyeglasses temple according to the present invention.
Figure 2:
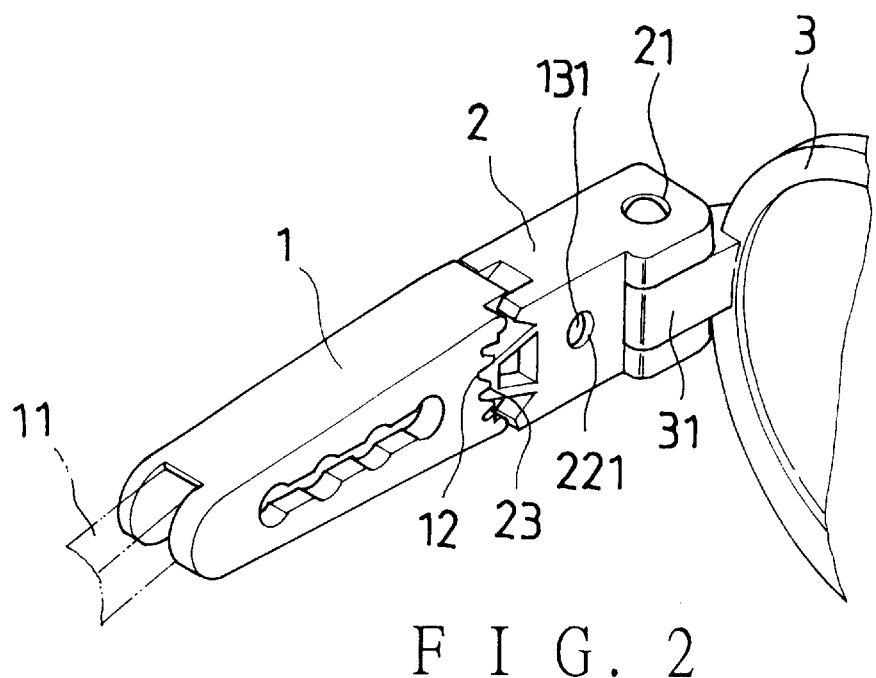
FIG. 2 is a perspective view of the regulating device for an eyeglasses temple in FIG. 1.

Referring to FIGS. 1 and 2, a regulating device for an eyeglasses temple of the present invention includes a movable member 1 and a connecting member 2.

The movable member 1 is connected to a front end portion of a temple 11, and has a curved toothed portion 12, and a protruding part 13 at a front end; the protruding part 13 has a pivotal projection 131.

The connecting member 2 has a pivotal hole 21, and is pivoted to a connecting part 31 of a rim 3 of a pair of eyeglasses from the pivotal hole 21. The connecting member 2 further has a receiving room 22, an engaging part 23, and a through hole 221.

The front end portion of the protruding part 13 of the movable member 1 is passed into the receiving room 22 of the connecting member 2 with the pivotal projection 131 movably fitted into the through hole 221 of the connecting member 2, and with the engaging part 23 separably engaging a part of the curved toothed portion 12 of the movable member 1; thus, the movable member 1 associated with the temple 11 can pivot on the connecting member 2 for changing an angle between the temple 11 and the rim 3.

The engaging part 23 and the curved toothed portion 12 are shaped such that the movable member 1 is stopped from moving relative to the connecting member 2 normally, but can be moved to a new position when force is applied on it (FIG. 6). Thus, the user of the eyeglasses can regulate the angle between the temple and the connecting member 2 pivoted to the rim 3 in order to get a most suitable position of the temples 11.

From the above description of the present invention, it can be easily seen that the regulating device for an eyeglasses temple can help the wearer to have a pair of eyeglasses tailor-made for him/her, while conventional temples can only provide the users with choices in respect of shapes and sizes.

What is claimed is:

1. An adjustable temple for an eyeglass frame comprising:

(a) at least one connecting member for pivotal coupling to a rim of the eyeglass frame, said connecting member having an intermediate part and a deflectable engagement part extending longitudinally therefrom, said engagement part defining a toothed end portion, said engagement part having a cavity formed therethrough adjacent said toothed end portion; and, (b) a movable member coupled in angularly displaceable manner to said connecting member, said movable member having a protruding part extending longitudinally therefrom, said protruding part pivotally engaging said intermediate part of said connecting member, said movable member including a curved toothed portion extending concavely about said toothed end portion of said connecting member engagement part, at least part of said curved toothed portion engaging said toothed end portion;

whereby said movable member is adjustably displaceable between a plurality of angularly offset positions, said connecting member engagement part being resiliently biased to maintain engagement with said curved toothed portion of said movable member.

* * * * *